US010653069B2

(12) United States Patent
Farley et al.

(10) Patent No.: US 10,653,069 B2
(45) Date of Patent: May 19, 2020

(54) RESIDUE HANDLING SYSTEM FOR AN AGRICULTURAL HARVESTER

(71) Applicant: CNH Industrial America LLC, New Holland, PA (US)

(72) Inventors: Herbert M. Farley, Elizabethtown, PA (US); Nathan E. Isaac, Lancaster, PA (US); Andrew Birkel, Downingtown, PA (US); Austin L. Jackson, East Earl, PA (US)

(73) Assignee: CNH Industrial America LLC, New Holland, PA (US)

( * ) Notice: Subject to any disclaimer, the term of this patent is extended or adjusted under 35 U.S.C. 154(b) by 245 days.

(21) Appl. No.: 15/539,545

(22) PCT Filed: Dec. 23, 2015

(86) PCT No.: PCT/US2015/000167
§ 371 (c)(1),
(2) Date: Jun. 23, 2017

(87) PCT Pub. No.: WO2016/105457
PCT Pub. Date: Jun. 30, 2016

(65) Prior Publication Data
US 2019/0124849 A1    May 2, 2019

Related U.S. Application Data

(60) Provisional application No. 62/096,156, filed on Dec. 23, 2014.

(51) Int. Cl.
*A01D 41/12*     (2006.01)
*A01F 12/46*     (2006.01)
(Continued)

(52) U.S. Cl.
CPC .......... *A01F 12/46* (2013.01); *A01D 41/1243* (2013.01); *A01F 12/40* (2013.01);
(Continued)

(58) Field of Classification Search
CPC ........ A01F 12/46; A01F 12/40; A01F 12/444; A01F 17/02; A01F 29/04; A01D 41/1243
See application file for complete search history.

(56) References Cited

U.S. PATENT DOCUMENTS 2,889,862 A * 6/1959 Williamson ............ A01F 29/04
                                                241/190
3,490,460 A * 1/1970 Baumeister ............ A01D 41/02
                                                460/119
(Continued)

FOREIGN PATENT DOCUMENTS

CN    106455491      * 8/2014 ............. A01F 12/40
DE    102006042970 A1 * 4/2008 ......... A01D 41/1243
(Continued)

*Primary Examiner* — Robert E Pezzuto
*Assistant Examiner* — Adam J Behrens
(74) *Attorney, Agent, or Firm* — Patrick Sheldrake; Peter Zacharias

(57) ABSTRACT

An agricultural harvester includes a threshing and separating system for separating grain from non-grain crop material, and a residue handling system for receiving at least a portion of the non-grain crop material. The residue handling system includes a chopper and a windrow arrangement, each having an inlet. A door is movable between a closed position which directs the non-grain crop material to the chopper and an open position which directs the non-grain crop material to the windrow arrangement. A feed roller is positioned adjacent to and between the inlet of the chopper and windrow arrangement. The feed roller is rotatable in a first direction which directs the non-grain crop material to the chopper when the door is in the closed position, and a second (Continued)

direction which directs the non-grain crop material to the windrow arrangement when the door is in the open position.

18 Claims, 16 Drawing Sheets

(51) Int. Cl.
    *A01F 12/40*     (2006.01)
    *A01F 12/44*     (2006.01)
    *A01F 17/02*     (2006.01)
    *A01F 29/04*     (2006.01)

(52) U.S. Cl.
    CPC ............ *A01F 12/444* (2013.01); *A01F 17/02* (2013.01); *A01F 29/04* (2013.01)

(56) References Cited

U.S. PATENT DOCUMENTS

| | | | | |
|---|---|---|---|---|
| 3,670,739 A * | 6/1972 | Rowland-Hill | ........... | A01F 7/06 460/66 |
| 5,036,652 A * | 8/1991 | Schmittbetz | ........... | A01D 43/00 460/114 |
| 5,833,533 A * | 11/1998 | Roberg | ................... | A01F 12/40 460/112 |
| 6,554,701 B1 * | 4/2003 | Wolters | ................. | A01F 12/444 460/101 |
| 7,648,413 B2 * | 1/2010 | Duquesne | ........... | A01D 41/127 460/112 |
| 7,717,779 B1 * | 5/2010 | Weichholdt | ........ | A01D 41/1243 460/112 |
| 7,950,989 B2 * | 5/2011 | Dow | .................. | A01D 41/1243 460/112 |
| 8,079,900 B2 * | 12/2011 | Klein | .................. | A01D 41/1243 460/111 |
| 9,578,803 B2 * | 2/2017 | Desmet | .............. | A01D 41/1243 |
| 9,686,916 B2 * | 6/2017 | Biggerstaff | ........ | A01D 41/1243 |
| 2002/0077163 A1 * | 6/2002 | Buermann | .............. | A01F 12/40 460/112 |
| 2002/0086722 A1 * | 7/2002 | Kuhn | .................. | A01D 41/1243 460/100 |
| 2004/0176151 A1 * | 9/2004 | Gryspeerdt | ........ | A01D 41/1243 460/112 |
| 2005/0282602 A1 * | 12/2005 | Redekop | ........... | A01D 41/1243 460/112 |
| 2009/0042625 A1 * | 2/2009 | Dow | .................. | A01D 41/1243 460/112 |
| 2011/0045883 A1 * | 2/2011 | Weichholdt | ........ | A01D 41/1243 460/112 |
| 2012/0270613 A1 * | 10/2012 | Isaac | ....................... | A01F 12/40 460/111 |
| 2016/0044870 A1 * | 2/2016 | Mayerle | ............. | A01D 41/1243 460/112 |
| 2016/0057928 A1 * | 3/2016 | Mackin | ................. | A01F 12/444 280/782 |
| 2016/0088794 A1 * | 3/2016 | Baumgarten | ........ | A01D 41/127 460/1 |
| 2016/0135377 A1 * | 5/2016 | Ballegeer | ........... | A01D 41/1243 460/112 |
| 2017/0079207 A1 * | 3/2017 | Puryk | ................. | A01D 41/1243 |
| 2018/0070534 A1 * | 3/2018 | Mayerle | ................. | A01F 12/40 |

FOREIGN PATENT DOCUMENTS

| | | | | |
|---|---|---|---|---|
| EP | 2008505 A1 | 12/2008 | | |
| FR | 1194282 A * | 11/1959 | ............ | A01F 12/40 |
| WO | 2014035822 A1 | 3/2014 | | |

* cited by examiner

Residue Mode Selection

| 1. Spread LongStraw Mode | 2. Swath Mode | 3. Standard Chop Mode | 4. Swath Chaff Mode | 5. Max Chop Mode |
|---|---|---|---|---|
| Integral Chopper = Low | Integral Chopper = Low | Integral Chopper = Low | Integral Chopper = Low or High | Integral Chopper = High |
| Rear Chopper = Low | Rear Chopper = High | Rear Chopper = High | Rear Chopper = High or Low | Rear Chopper = High |
| Selection Door Closed | Selection Door Open | Selection Door Closed | Selection Door Closed | Selection Door Closed |
| Feed Roller Off | Feed Roller On | Feed Roller Off | Feed Roller Off | Feed Roller Off |
| Chaff Pan Raised | Chaff Pan Raised | Chaff Pan Raised | Chaff Pan Lowered | Chaff Pan Raised |

FIG. 16

RESIDUE HANDLING SYSTEM FOR AN AGRICULTURAL HARVESTER

BACKGROUND OF THE INVENTION

1. Field of the Invention

The present invention relates to agricultural harvesters such as combines, and, more particularly, to residue spreader systems used with such harvesters.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field using a chopper/spreader unit. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

A chopper/spreader, as mentioned above, chops the non-grain residue to reduce the length of straw harvested for reduced time of degradation upon the field. However, with some configurations of residue choppers, not all material enters the chopper to be processed. Further, choppers that may capture all of the material discharged from the machine do not permit a convenient drive line path due to other components on the vehicle that may not be readily moved, such as fuel tanks, diesel exhaust fluid (DEF) tanks, etc. Further, existing systems do not provide a convenient method of converting between various residue handling modes and may provide poor performance due to the disruption of the flow of straw when the system is in a particular mode. Additionally, such choppers typically do not have a configuration that permits the chaff and weed seeds from the cleaning shoe to be windrowed behind the machine and not spread out, while simultaneously chopping and spreading the straw.

What is needed in the art is a residue handling system that chops all of the crop material, unless diverted via another path, and conveniently adjusts between more than two residue handling modes.

SUMMARY OF THE INVENTION

The present invention provides a residue handling system for a combine that has a door movable between a chopping position and a windrow position, a feed roller positioned adjacent an inlet of the chopper and windrow arrangement and rotatable based on a position of the door, and a mechanical drive which is arranged so as not to interfere with other components onboard the harvester.

The invention in one form is directed to an agricultural harvester, including a threshing and separating system for separating grain from non-grain crop material, and a residue handling system for receiving at least a portion of the non-grain crop material. The residue handling system includes a chopper and a windrow arrangement, each having an inlet. A door is movable between a closed position which directs the non-grain crop material to the chopper and an open position which directs the non-grain crop material to the windrow arrangement. A feed roller is positioned adjacent to and between the inlet of the chopper and windrow arrangement. The feed roller is rotatable in a first direction which directs the non-grain crop material to the chopper when the door is in the closed position, and a second direction which directs the non-grain crop material to the windrow arrangement when the door is in the open position.

An advantage of the present invention is that the residue handling system is lightweight and easily switchable between different modes of operation.

Another advantage is that the feed roller can be reversed, dependent on the door position, to feed material to either the chopper or the windrow arrangement.

Yet another advantage is that the feed roller can be moved between different operating positions or a second feed roller can be used.

A further advantage is that the operating angular orientation of the swath board can be varied, dependent on the position of the door.

A still further advantage is that the mechanical drive can be configured and arranged so that it occupies minimum space onboard the harvester and does not interfere with the placement or operation of other components.

A further advantage is that an infeed pan can be used in front of the chopper, and folded between feed and bypass positions.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 16 is a logic state chart based on various operational states of the residue handling system of the present invention.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
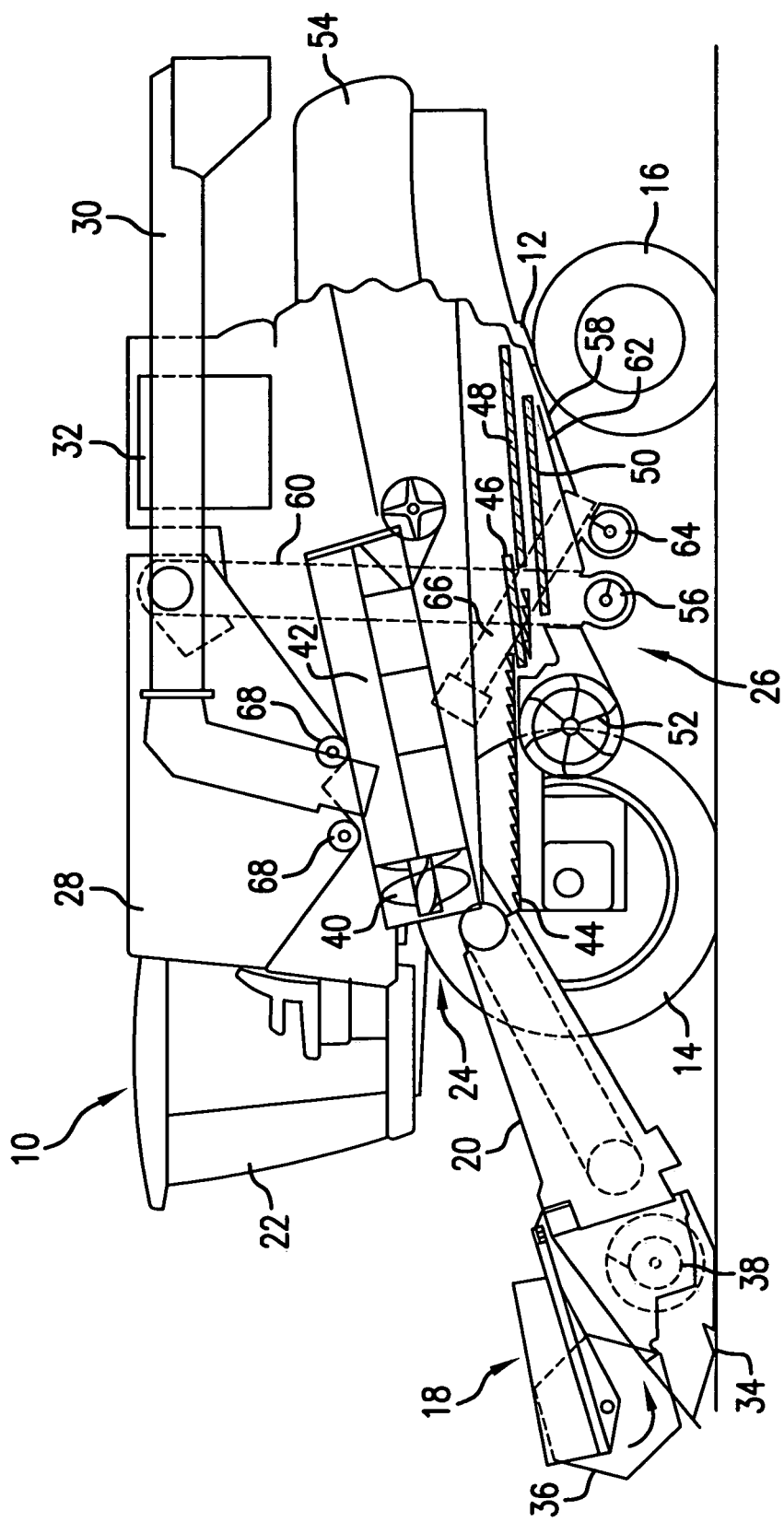
FIG. 1 is a side view of an embodiment of an agricultural harvester in the form of a combine which may include a residue handling system of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
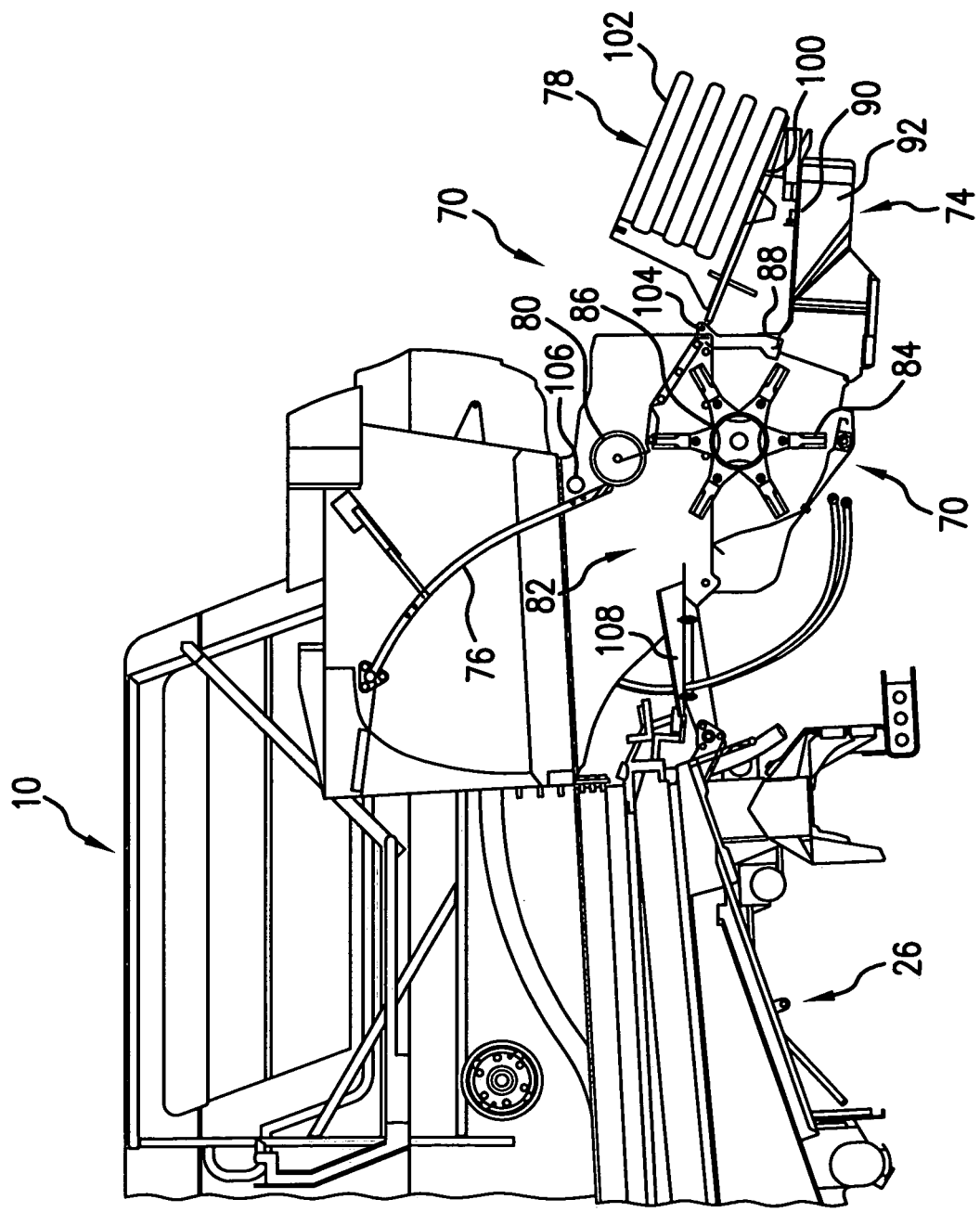
FIG. 2 is a side sectional view of an embodiment of a residue handling system of the present invention, with the selection door in the closed position.
Figure 3:
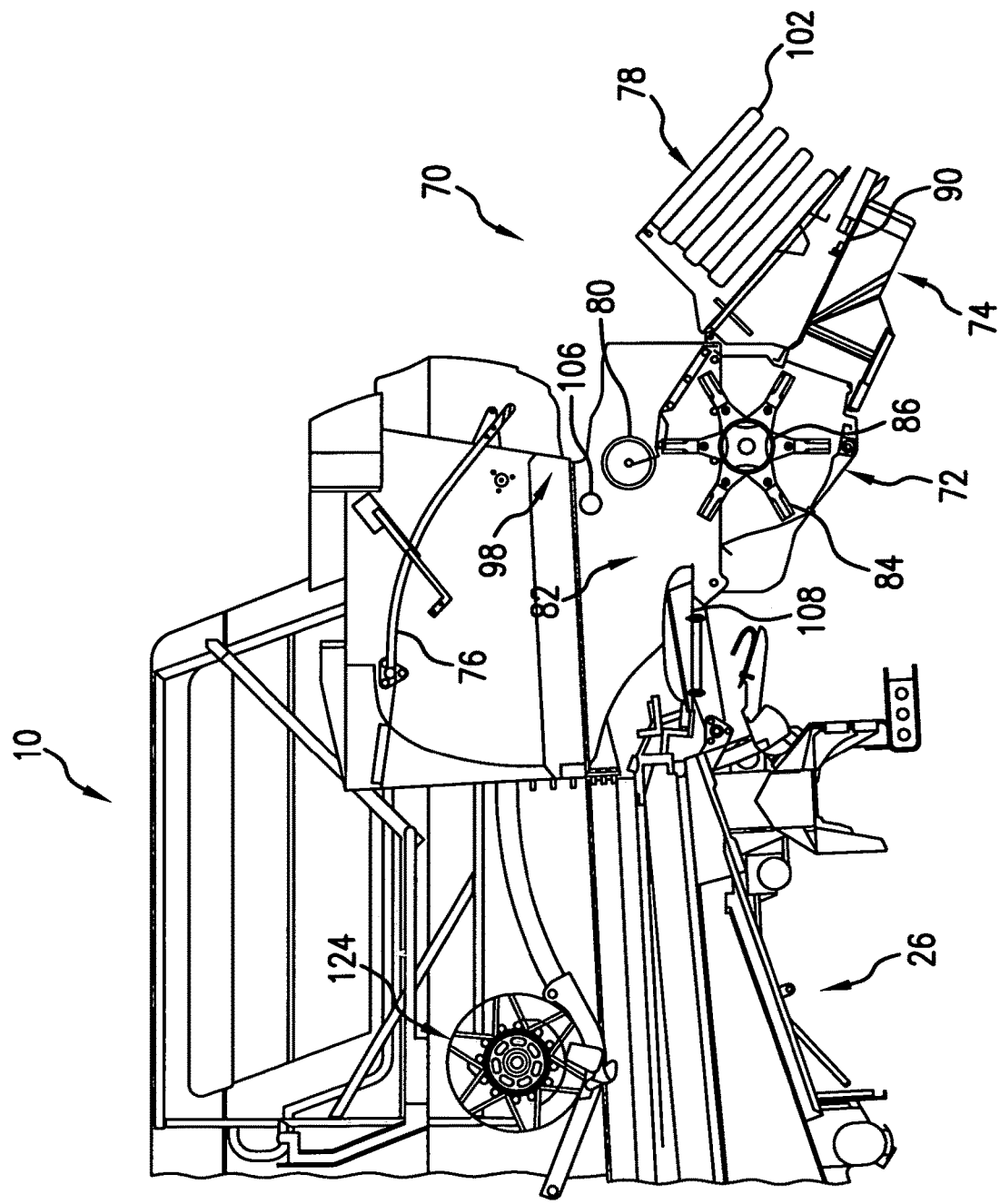
FIG. 3 is a side sectional view of the residue handling system shown in FIG. 2, with the selection door in the open position and the spreader folded downward.
Figure 4:
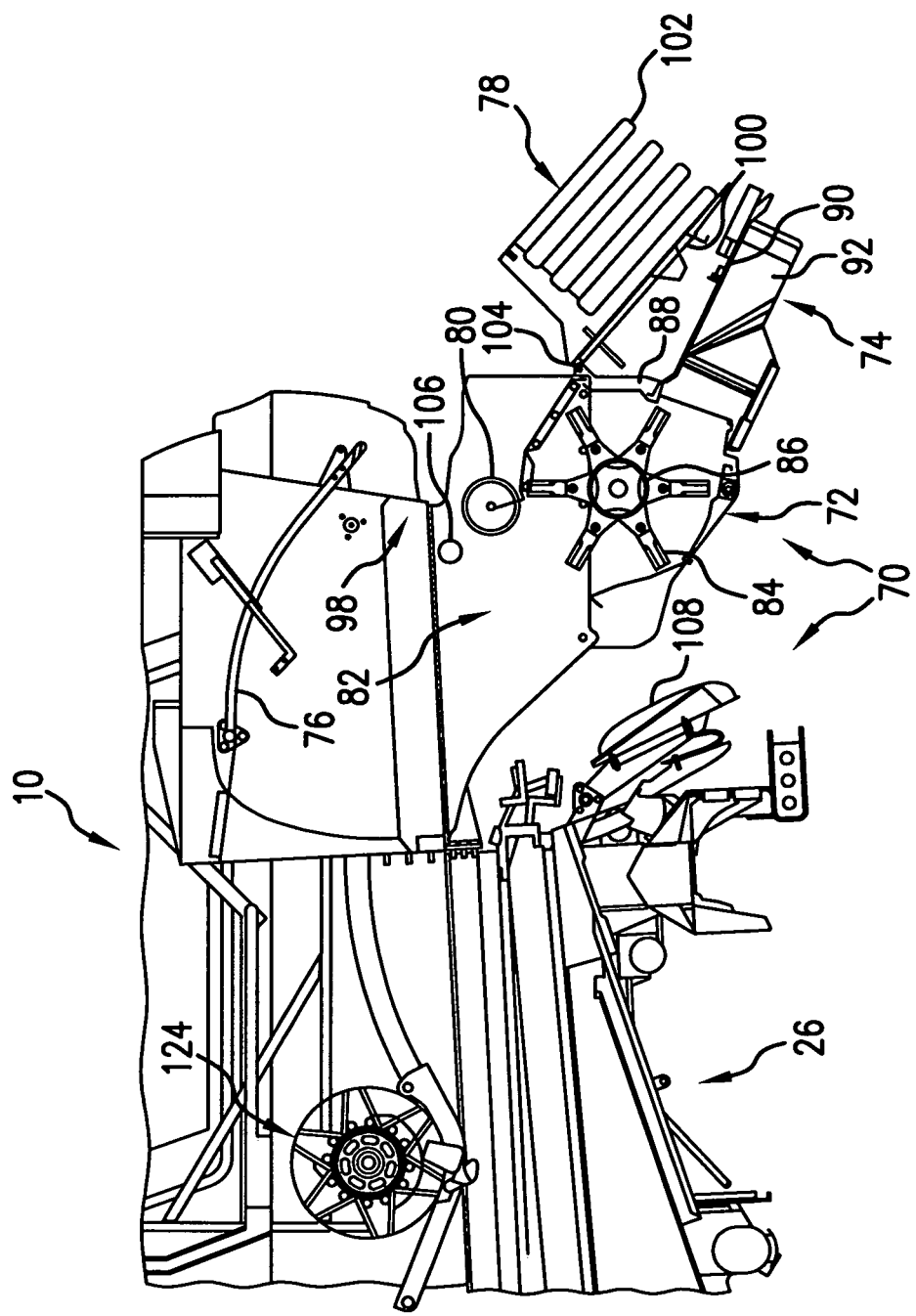
FIG. 4 is a side sectional view of the residue handling system shown in FIG. 3, with the infeed pan folded downward.

According to an aspect of the present invention, a residue handling system 70 is located at the lower rear portion of the straw hood 54 which processes and/or distributes the non-grain crop material which passes through the rotor 40. The residue handling system 70 generally includes a chopper 72, a spreader 74, a door 76, a windrow arrangement 78 and a feed roller 80 (FIGS. 2-4).

The chopper 72 includes an inlet 82 at an upstream end thereof, and a beater 84 which rotates against a number of selectively engageable counter knives (not shown), which together chop the straw into smaller pieces to be spread on the field. The chopper 72 has a rotatable drive element 86 located at one side of the chopper 72. In the embodiment shown, the rotatable drive element 86 is configured as a pulley, but could also be configured as a gear, drive shaft, etc.

Figure 7:
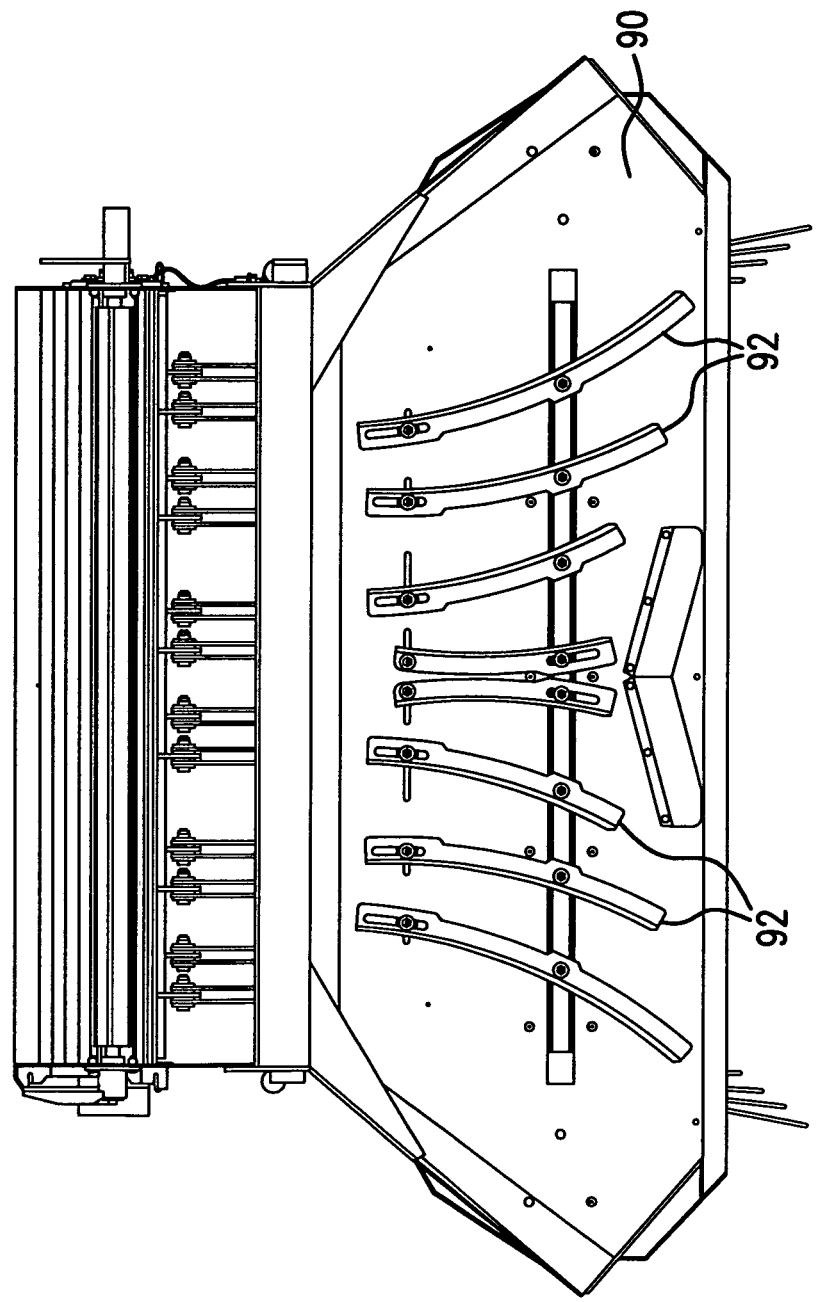
FIG. 7 is a bottom view of the spreader shown on the residue handling system of FIGS. 2-4, with the vanes being in a narrow position.
Figure 8:
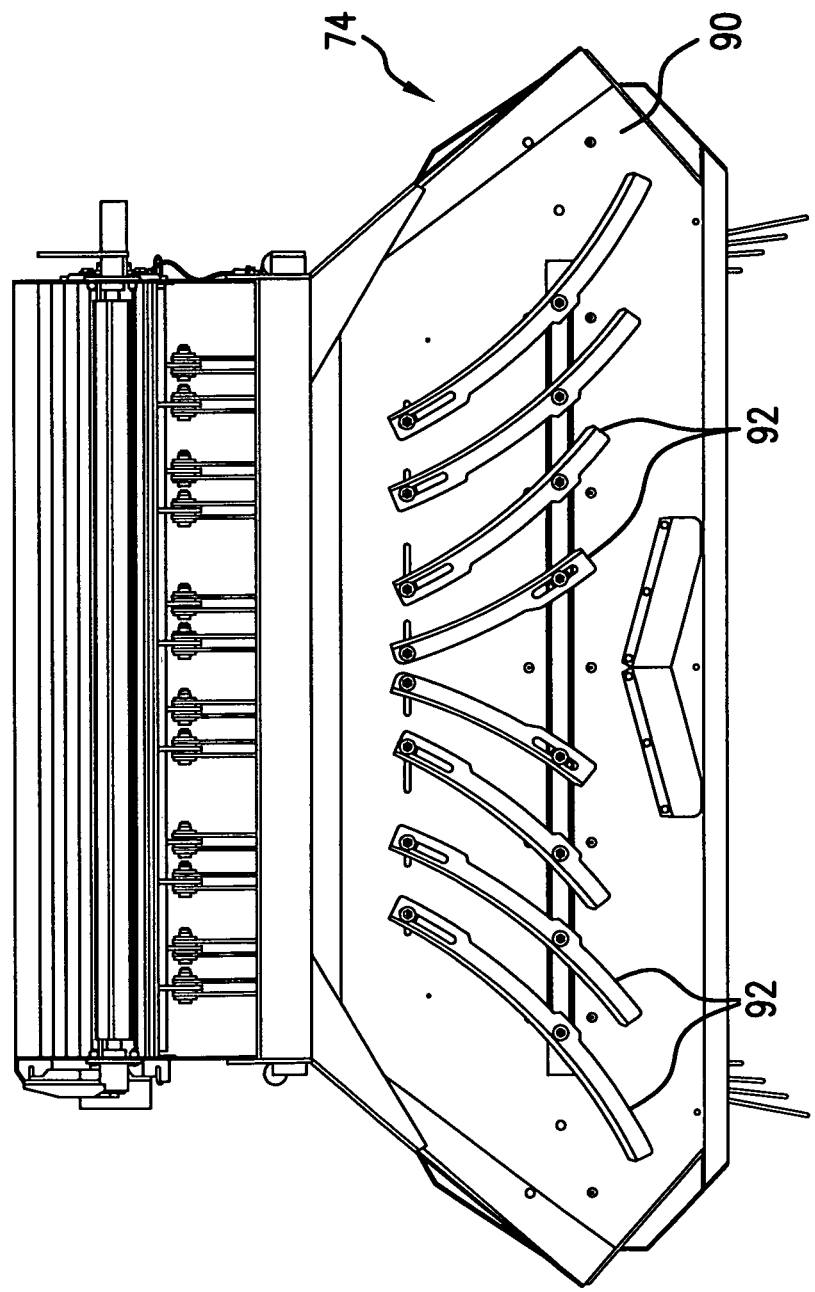
FIG. 8 is a bottom view of the spreader shown in FIG. 7, with the vanes being in a wide position.

The spreader 74 is positioned downstream and receives chopped non-grain crop material from the chopper 72, and spreads the chopped non-grain crop material on the field. The spreader 74 is pivotally movable relative to the straw-hood frame at a pivot location 88 in upward and downward directions. To that end, any suitable type of actuator (not specifically shown), such as a hydraulic or electrical actuator, can be used to effect the pivoting movement of the spreader 74. The spreader 74 can be configured as a passive spreader with spread board 90 at an upper portion thereof and a plurality of vanes 92 which direct the crop material in a particular direction. The vanes 92 may be controllably movable to direct the crop material in a desired direction. For example, the vanes 92 may be placed in a narrow configuration for directing the crop material mostly in a rearward direction (FIG. 7), or a wide configuration for directing the crop material mostly in a laterally outward direction (FIG. 8). In one embodiment, the vanes 92 are movable to a position directing non-grain crop material laterally outwards when the door 76 is in the open position.

Figure 9:
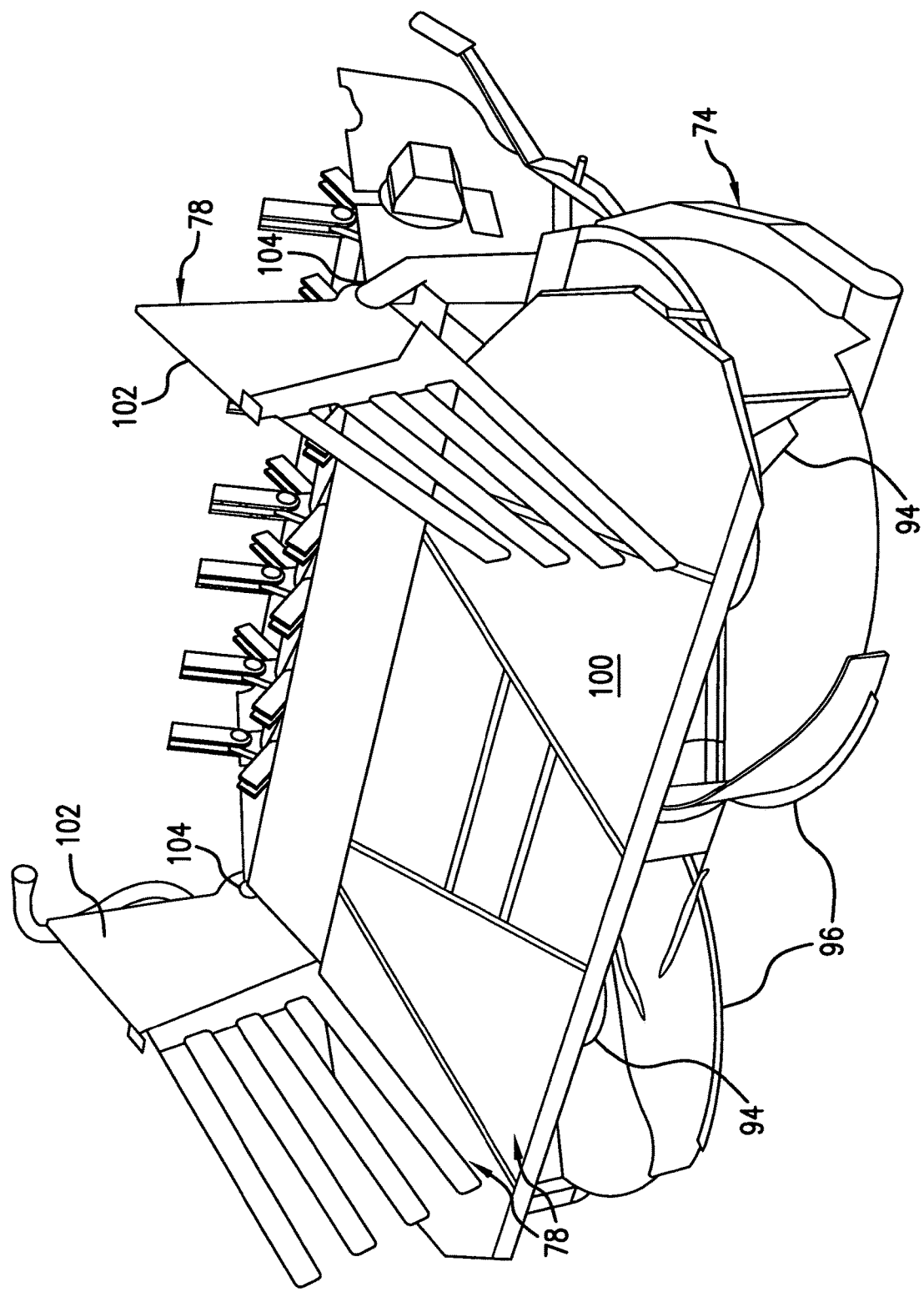
FIG. 9 is a perspective view of another embodiment of a spreader and windrow arrangement which may be used with the residue handling system of the present invention.

In another embodiment, the spreader 74 can be configured as an active spreader with a pair of counter-rotating impellers 94 located at the bottom of the spreader board (see FIG. 9). When configured as an active spreader, a pair of controllably movable deflector plates 96 may be positioned rearward of the impellers 94 to deflect the residue at a desired trajectory.

The windrow arrangement 78 is positioned above the spreader 74, and has an inlet 98 which receives crop material when the door 76 is in the open position (FIG. 3). The windrow arrangement 78 includes a swath board 100 and a pair of guides 102 positioned at each lateral side of swath board 100. The front of the swath board 100 is pivotally connected to the straw hood frame at a pivot location 104 and pivots to a more downward orientation when in the swathing mode (compare FIGS. 2 and 3). The rear end of the swath board 100 lies on and is carried by (e.g., slides on) the spread board 90. Thus, as the spread board 90 is moved upward or downward to a selected angular orientation, the swath board 100 likewise moves up or down and thereby changes a discharge direction onto the field. In one embodiment, based on positional control of the spread board 90, the swath board 100 is movable between a raised position when the door 76 is in the closed position, and a lowered position when the door 76 is in the open position.

Other ways of moving the swath board 100 are also possible. For example, a separate actuator could be coupled with the swath board 100 and used to move (e.g., tilt) the swath board 100, independent from movement of the spread board 90, and dependent on a position or other criteria associated with the selection door 76.

The selection door 76 is movable between a closed position which directs the non-grain crop material to the inlet 82 of the chopper 72 (FIG. 2), and an open position which directs the non-grain crop material to the inlet 98 of the windrow arrangement 78 (FIG. 3). Criteria associated with the position of the door can be used for control of other components, such as an angular orientation of the swath board 100 and/or spreader 74. For example, a sensor 106 (shown schematically in FIG. 2) can sense when the door 76 is at or near the closed position. In one embodiment, the sensor 106 can be a proximity sensor which is located adjacent to the door 76 when the door 76 is in the closed position. As another example, a number of sensors could be arranged in the side wall of the straw hood to detect when the door is at different positions, or an inclinometer could be mounted near the top of the door to detect an angular inclination of the door. Other configurations are also possible.

The feed roller 80 is positioned adjacent to and between the inlet 82 of the chopper 72 and the inlet 98 of the windrow arrangement 78. The feed roller 80 can be configured to rotate in a single direction, in which case the feed roller 80 will feed crop material toward the windrow arrangement 78 when the door 76 is in the open position. Alternatively, the feed roller 80 can be configured to rotate in opposite directions, depending on the positional state of the door 76. For example, the feed roller 80 can be configured to be rotatable in a first direction (counter clockwise in FIG. 2) which directs the non-grain crop material to the chopper 72 when the door 76 is in the closed position, and a second direction (clockwise in FIG. 3) which directs the non-grain crop material to the windrow arrangement 78 when the door 76 is in the open position. As described above, the positional state of the door 76 can be an actual sensed position of the door 76 or an angular orientation of the door 76.

An optional infeed pan 108 is carried by the cleaning system 26 and extends in a rearward direction toward the inlet 82 of the chopper 72. The infeed pan 108 is pivotally attached to the cleaning system 26 and selectively pivotable up and down between a first position (FIGS. 2 and 3) directing chaff from the cleaning system 26 toward the inlet 82 of the chopper 72, and a second position (FIG. 4) directing chaff toward the ground in front of the chopper 72. The infeed pan 108 can either be manually and/or automatically folded, depending on the configuration.

Figure 5:
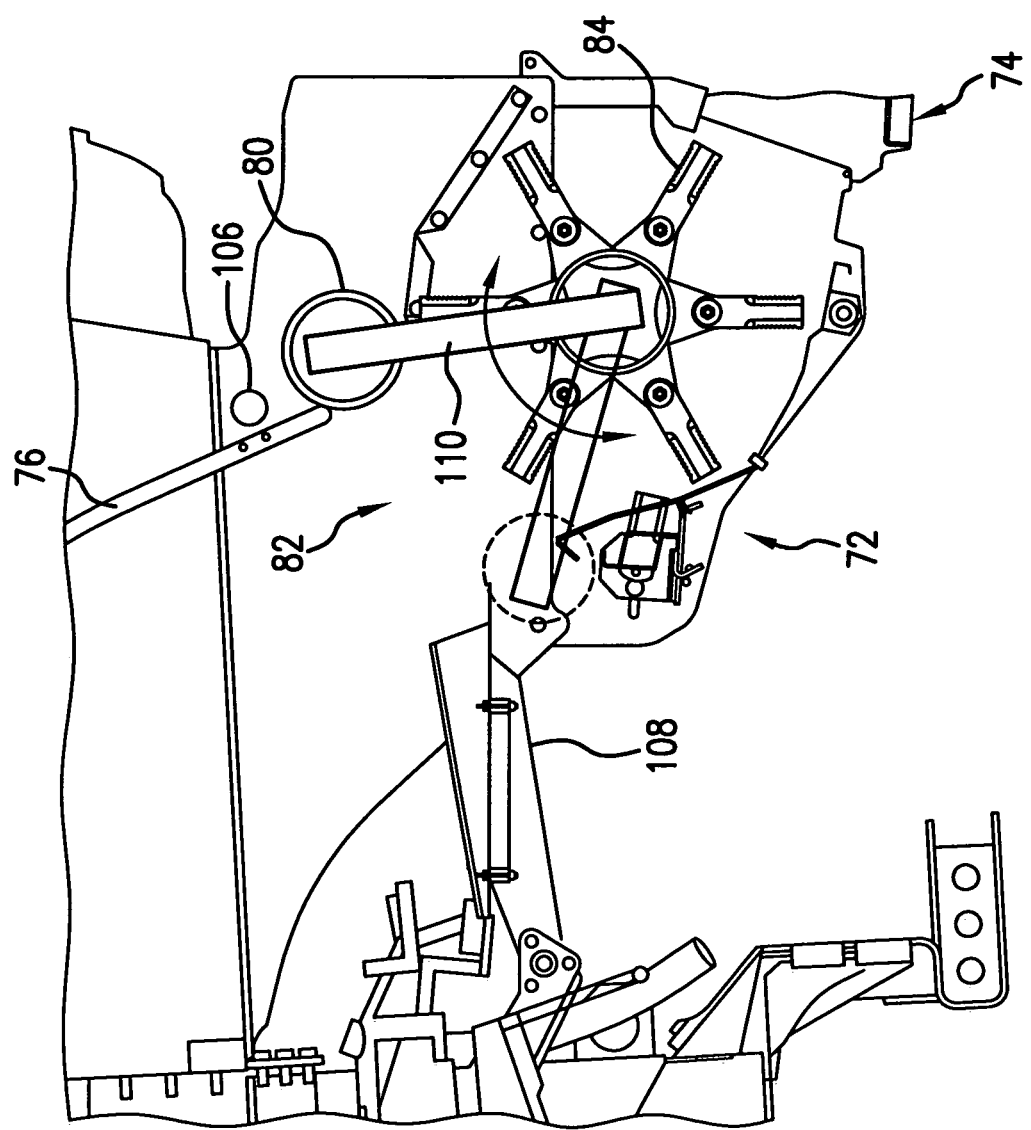
FIG. 5 is a side sectional view of another embodiment of a residue handling system of the present invention, with the feed roller being pivotable between two locations.

In another embodiment of the invention (FIG. 5), the feed roller 80 is movable between a first position adjacent to and between the inlets 82 and 98, and a second position between the inlet 82 of the chopper 72 and the infeed pan 108. In the illustrated embodiment, a swing arm 110 carries and moves the feed roller 80 between the first position and the second position.

Figure 6:
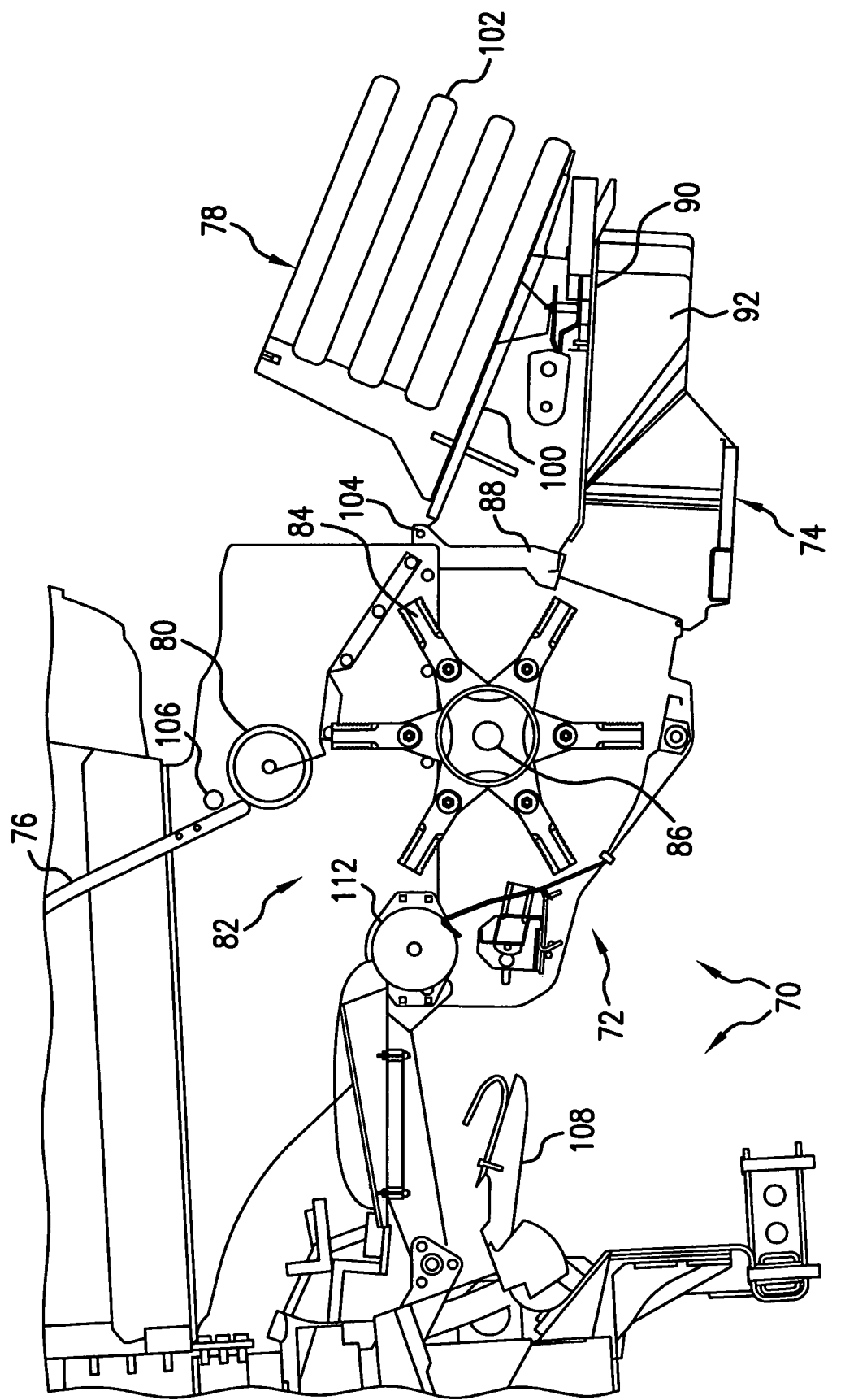
FIG. 6 is a side sectional view of another embodiment of a residue handling system of the present invention, including a second feed roller.

In yet another embodiment of the invention (FIG. 6), the residue handling system 70 can include two feed rollers, with the feed roller 80 being adjacent to and between the inlets 82 and 98, and a second feed roller 112 being between the inlet 82 of the chopper 72 and the infeed pan 108. The second feed roller 112 would always rotate in a direction to move the chaff from the cleaning system toward the chopper 72 (clockwise in FIG. 6), and the first feed roller 80 could rotate in either direction based on the positional state of the door 76, as described above.

Figure 10:
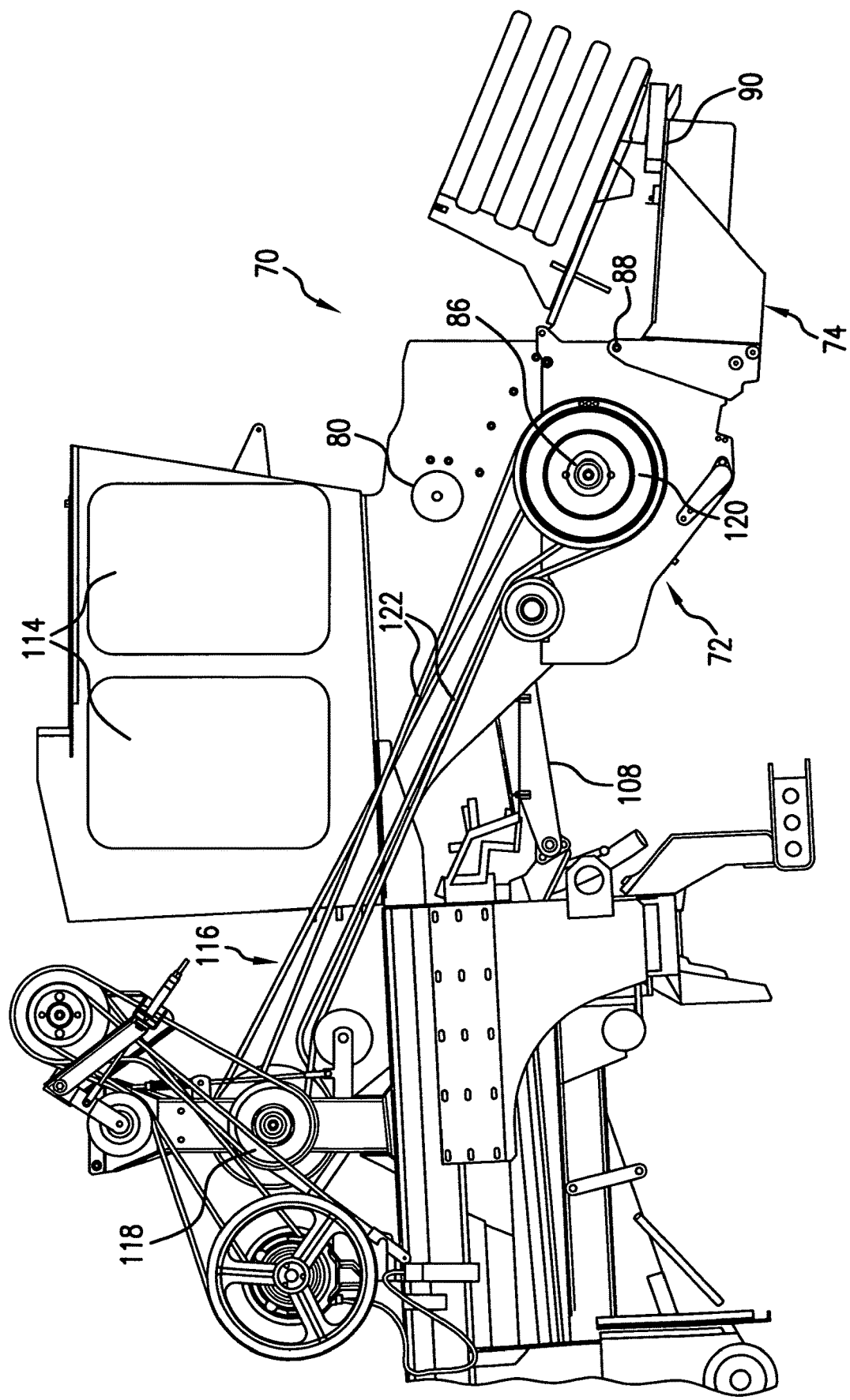
FIG. 10 is a side view of an embodiment of a mechanical drive which may be used with the residue handling system of the present invention.
Figure 11:
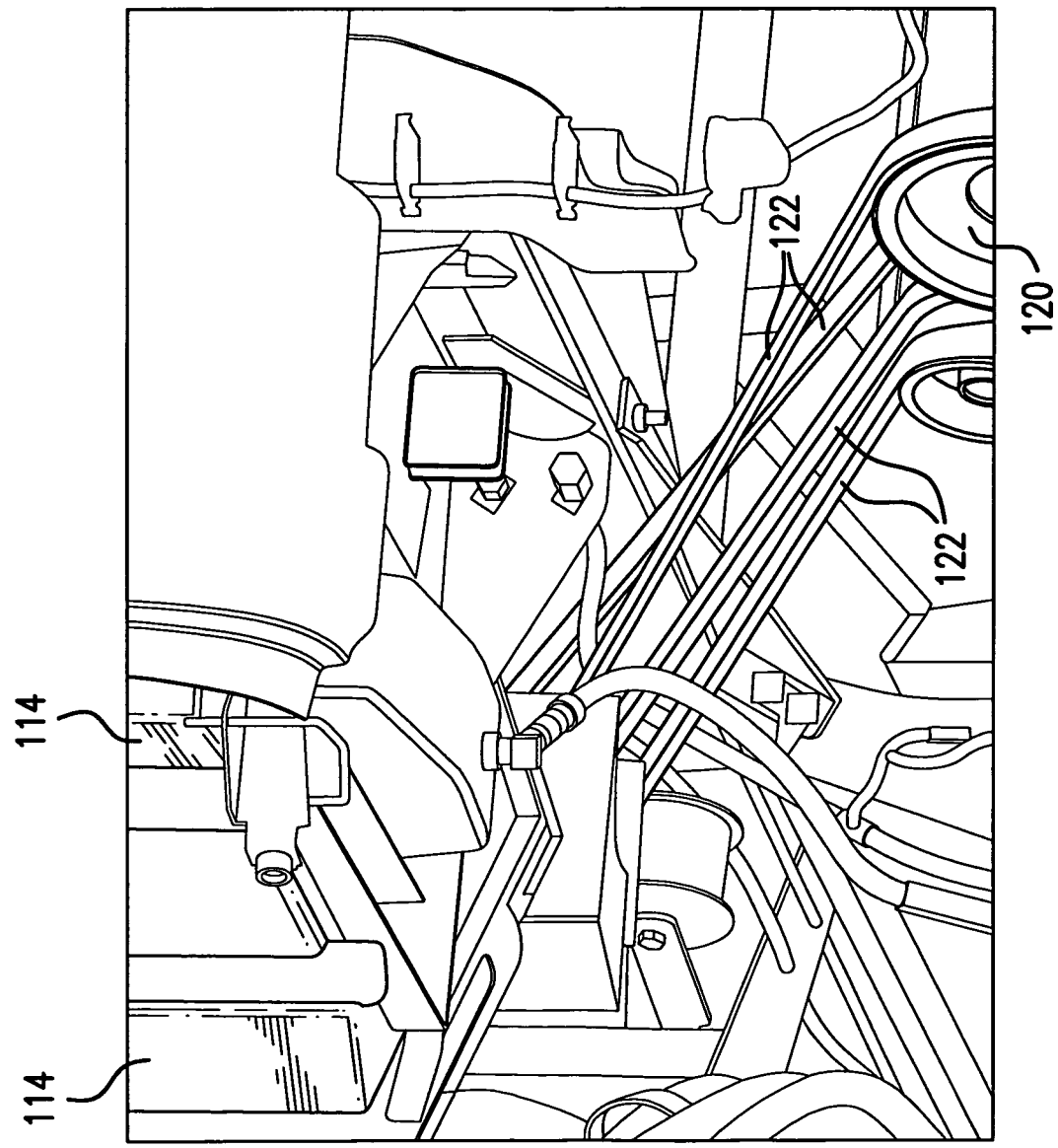
FIG. 11 is a perspective view of a portion of the mechanical drive shown in FIG. 10.

Referring now to FIGS. 10 and 11, the harvester 10 may also include at least one additional component 114 positioned generally above the drive element, which may potentially interfere with driving the residue handling system 70, particularly the chopper 72. For example, the harvester 10 may include an additional component in the form of a fuel tank or a diesel exhaust fluid (DEF) tank which is positioned above the residue handling system 70 and interferes with driving the chopper 72. To that end, the harvester 10 also may include a mechanical drive 116 which is configured and arranged to bypass over or under the additional component to drive the chopper 72.

The mechanical drive 116 has an input end 118, an output end 120 and a drive component 122 interconnecting the input end 118 and output end 120. The input end 118 is positioned forward of the additional component 114 relative to a direction of travel of the harvester 10, an output end 120 coupled with the drive element 86 of the chopper 72, and a drive component 122 interconnecting the input end 118 and output end 120 and passing under or over the additional component 114. In the embodiment shown in FIGS. 10 and 11, the mechanical drive 116 is in the form of a pair of belts which are respectively carried by different sized pulleys, and may be selectively engaged using a clutch or the like (not specifically shown) to provide chopper 72 with two different operating speeds.

Figure 12:
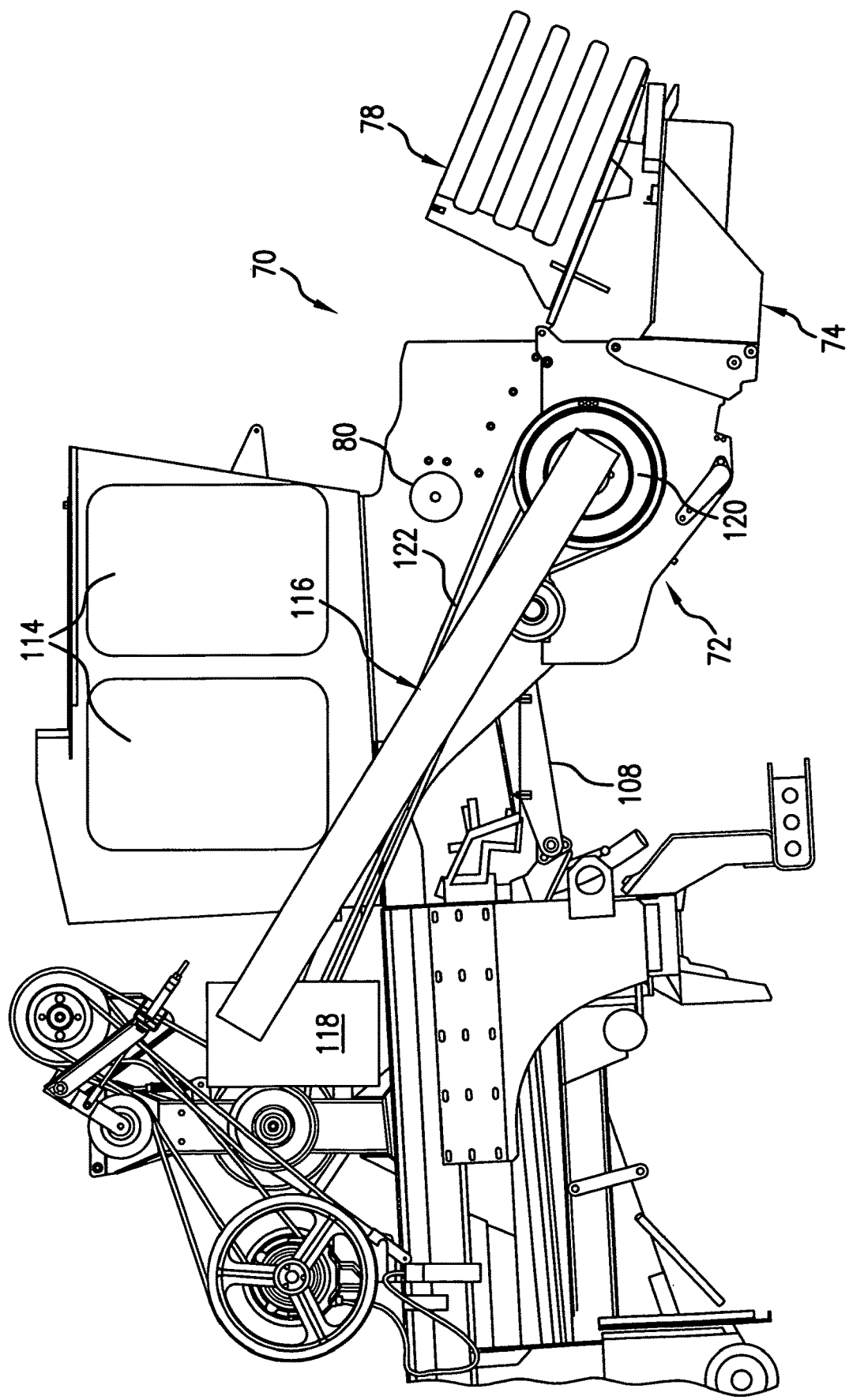
FIG. 12 is a side view of another embodiment of a mechanical drive which may be used with the residue handling system of the present invention.

Referring now to FIG. 12, there is shown a different embodiment of a mechanical drive 116 which includes an input end 118 with a gear box, and a drive component 122 in the form of a drive shaft. The output end 120 can directly drive the input shaft to the beater 84, or can be connected via a gearbox, gear, etc., depending on the application.

Figure 13:
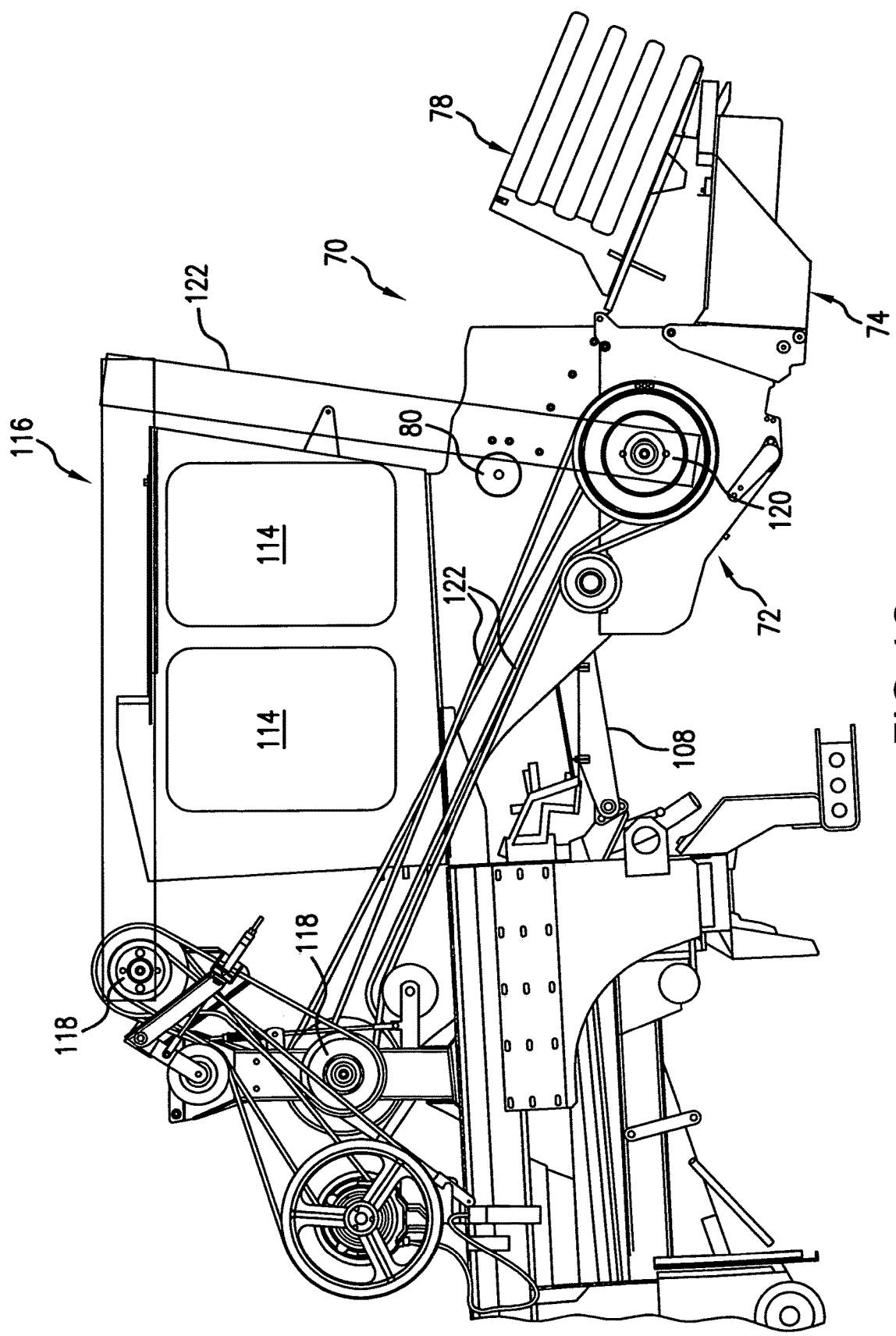
FIG. 13 is a side view of yet another embodiment of a mechanical drive which may be used with the residue handling system of the present invention.

FIG. 13 illustrates yet another embodiment of a mechanical drive 116, showing an alternate drive path which is located above rather than below the additional component 114. Of course, the mechanical drive 116 can include any desired combination of belts, shafts, pulleys, gears, etc., and drive the chopper 72 with a single or multiple operating speeds.

During operation of the residue handling system 70, the chopper receives a material stream from an integral discharge beater or chopper rotor. In the strawhood frame, the selection door 76 diverts the crop either to the chopper 72 for length reduction, or is pivoted upward to divert the straw flow over the chopper 72 to form a swath. Further, due to a desired geometry of the chopper, the feed roller 80 is mounted directly above and tangential to the chopper housing and rotates in a clockwise direction (viewed from left, bottom forward) to ensure that the straw material does not accumulate on top of the chopper housing. The feed roller 80 is preferably hydraulically driven. The proximity sensor 106 near the windrow door is used to sense when the door 76 is in the closed position and provides an output signal that is used to selectively stop oil flow to the motor driving the feed roller 80 so that excess power is not consumed when not required. When the door 76 begins to pivot away from the sensor 106, the oil flow resumes to the motor. This may be controlled via a solenoid at the hydraulic valve and the on-board computer control system. Further, the feed roller 80 may rotate in either direction depending upon the angular position of the door 76. The angular position may be determined by a potentiometer and linkage to the door, or via feedback from a potentiometer within a controlling actuator. The feed roller 80 can rotate with the bottom portion rearward when the door 76 is in the lower half of the arc of rotation, and then change direction such that the bottom portion of the feed roller 76 will rotate forward when the door 76 is in the upper half of the arc of rotation. This change-over in direction may be controlled by the on-board computer and a flow reversing solenoid valve in the valve block.

The angle of the spread board 90 or active spreader is selectively controlled, dependent on whether the selection door 76 is opened or closed. When the door is closed (down), the spread board or active spreader can be in a raised position to maximize the spread width capacity. However, when it is desired to form a swath, the spread board or active spreader is lowered so that the air discharge and chaff discharge does not blow into the swath and disrupt it. When the door opens, an actuator will pivot the spread board or active spreader down to a desired angle that controls the angle of the swath board to provide the desired swath trajectory. This movement may occur automatically and at the same time while the machine is harvesting. Further, the spread board vanes 92 or active spreader deflector plates 96 may automatically be controlled to a position that diverts the chaff away from a rearward projection trajectory when the selection door 76 is in the open position. Conversely, when the door is lowered and the spread board and active spreader are returned to the spreading position, the vanes 92 or deflector plates 96 may automatically readjusted to the desired spreading position. Additionally, the swath board angle may be adjusted up or down according to the vehicle inclination (by adjusting the spread board or active spreader housing up and down via the actuator). The actuator may be electric, hydraulic or combination thereof, or other suitable device.

The cleaning shoe material stream is delivered to the chopper by the oscillating chaff infeed pan 108. The chaff infeed pan has two primary positions. The raised position feeds the material into the chopper 72, just above the inlet surface of the chopper housing. The second position is a down position, which is nearly vertical. The infeed pan 108 may have corrugations to assist the material transport. The chopper may be operated with the infeed pan 108 in the lowered (down) position which allows the cleaning shoe material to fall short of the chopper 72 and be windrowed. The infeed pan 108 is attached to the cleaning system 26, which imparts the oscillating motion. The infeed pan 108 may be directly or indirectly attached to the cleaning system 26. If indirectly attached, then the infeed pan 108 is supported by a lower linkage to permit the two positions, and has links coupling it to the cleaning shoe to cause a forward and backward motion.

Figure 14:
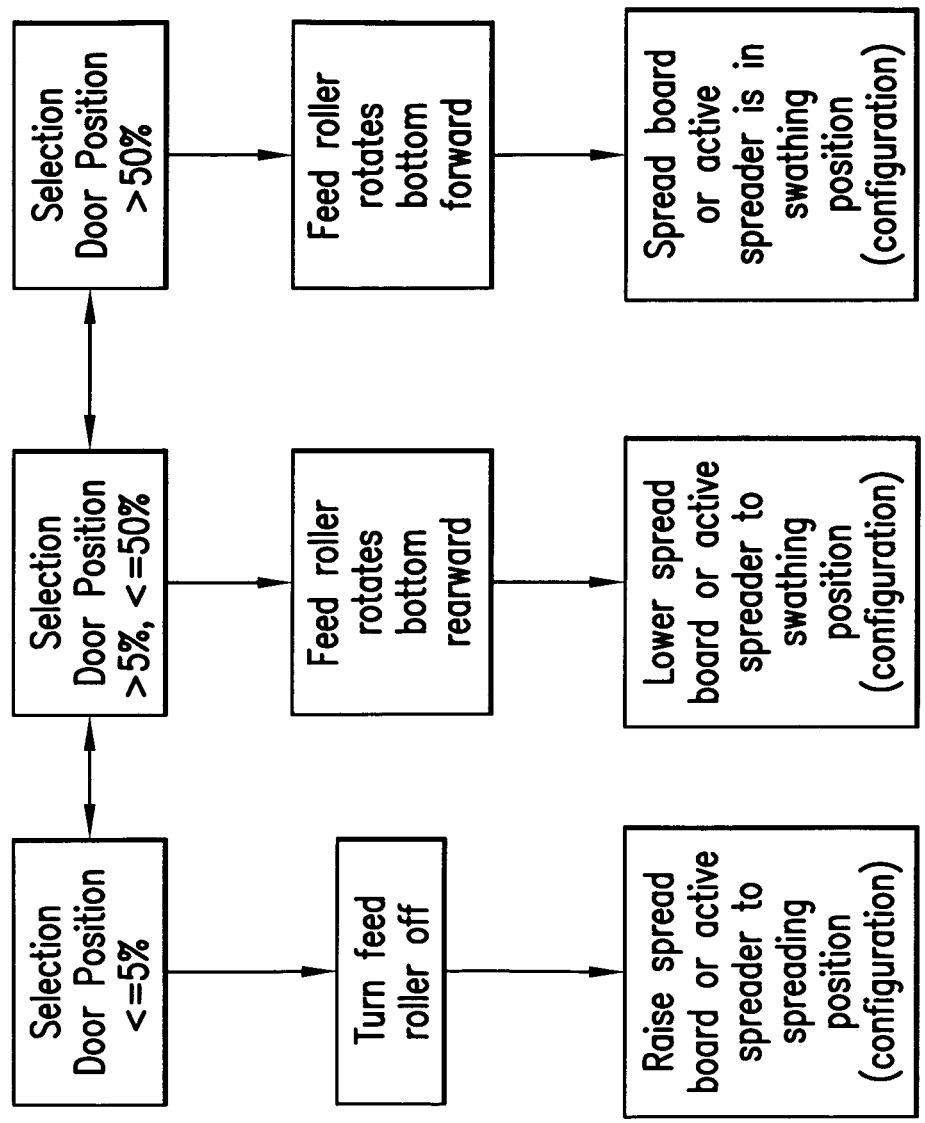
FIG. 14 is a logic flow diagram relating to the control logic of the residue handling system shown in FIGS. 2-4.
Figure 15:
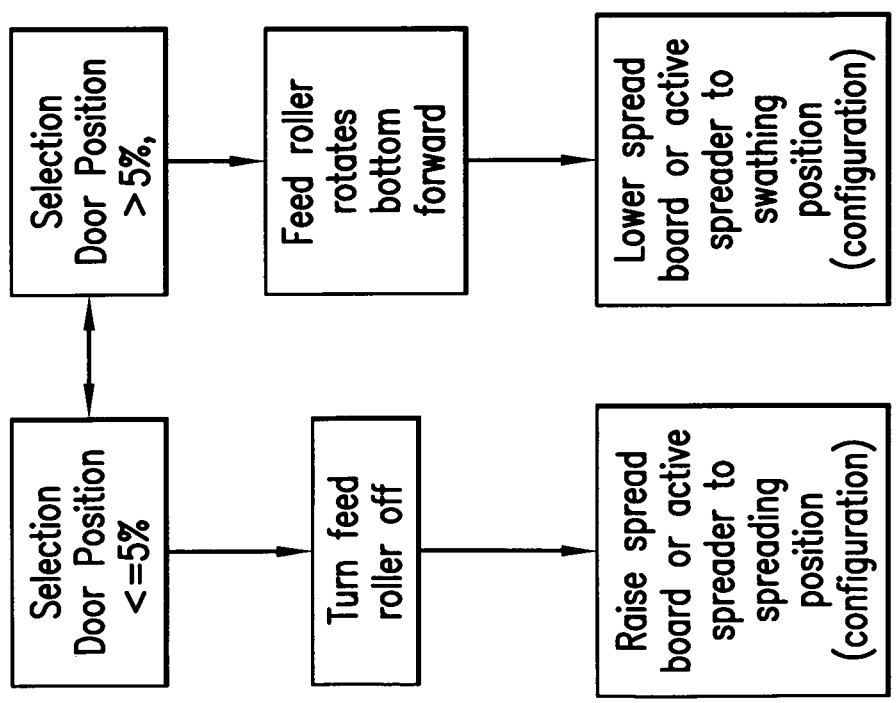
FIG. 15 is a logic flow diagram relating to another embodiment of the control logic of the residue handling system shown in FIGS. 2-4.

FIGS. 14 and 15 are logic flow diagrams for the control of the various controlled components of the residue handling system 70, such as the door 76, feed roller 80, chopper 72, spreader 74, etc. FIG. 14 is a logic flow diagram relating to the control logic of the residue handling system shown in FIGS. 2-4, with the feed roller 80 being rotatable in both directions. FIG. 15 is a logic flow diagram relating to another embodiment of the control logic of the residue handling system shown in FIGS. 2-4, with the feed roller 80 being rotatable in a single direction. The illustrated logic is believed to be self-evident from the flow charts, and thus not described further herein.

FIG. 16 is a logic state chart based on various operational states of the residue handling system of the present invention. As described above, the rear or hood mounted chopper 72 can be operated at multiple operating speeds using the mechanical drives shown in FIGS. 10, 12 and 13. Further, the combine 10 can be provided with an optional integral chopper 124 (see, e.g., FIGS. 3 and 4) which is located within the chassis or strawhood, and can likewise can be operated at multiple operating speeds. It is possible, based on the operating mode of the residue handling system, to select combinations of various operating speeds for both the integral chopper 124 and hood mounted chopper 72. In FIG. 16, the residue handling system is provided with five separate operational modes in the top horizontal row, numbered 1 through 5. For each mode, the state of different components are described (it should be noted that "low" and "high" refer to the operating speeds of the choppers, and not binary off/on states). The mechanical drives described above may include a gearbox, and the speed selection can be accomplished at the gearbox (Low-Low, Low-High, High-High, High-Low), instead of at 2 separate places. Currently the integral chopper has a shift collar on the shaft axis, and the rear chopper may include a shift collar on the jackshaft axis. Some complexity may be reduced by the 2 shifting locations and relocating both clutches to a single location, housed within the gearbox, with two (or more) outputs.

Various other modifications of the residue handling system 70 are also possible. For example, the system 70 may operate with either an integral chopper or beater in the machine. The chopper may permit straw to pass through without chopping it, if it is adjusted to a low speed setting (about one-third of high speed setting) and the counter knives are disengaged.

The chopper may utilize a shred bar to further improve chop performance. The chopper may utilize a special blade that produces wind or additional air flow, as known in the art. The chopper may be constructed with either fixed or flail type blades. The chopper may also include intermeshing counter knives and other interrupter bars. The chaff infeed pan may be replaced by air blowers that blow the chaff into the chopper. However, the blowers do not work well in heavier crops like corn. The chaff pan may be replaced by an auger bed that conveys the chaff and grain to the chopper. The auger bed would retain a pivot at the front to swing down for sieve access. The chaff pan may be replaced by a conveyor belt with a pivot axis at the front. The chopper may be powered by a hydrostatic or electrical drive system. Other modifications are also possible and within the scope of the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
a threshing and separating system for separating grain from non-grain crop material;
a residue handling system for receiving at least a portion of the non-grain crop material, the residue handling system including a chopper and a windrow arrangement, each having an inlet, and a door which is movable between a closed position which directs the non-grain crop material to the chopper and an open position which directs the non-grain crop material to the windrow arrangement, the residue handling system also including a feed roller positioned adjacent to and between the inlet of the chopper and windrow arrangement, the feed roller being rotatable in a first direction which directs the non-grain crop material to the chopper when the door is in the closed position, and a second direction which directs the non-grain crop material to the windrow arrangement when the door is in the open position; and
a cleaning system for grain configured to receive grain from the threshing and separating system, wherein the feed roller is movable between a first position adjacent to the inlet of the chopper and windrow arrangement, and a second position between the inlet of the chopper and an outlet of the cleaning system.

2. The agricultural harvester of claim 1, wherein the direction of rotation of the feed roller is dependent upon a position of the door.

3. The agricultural harvester of claim 2, wherein the direction of rotation of the feed roller is dependent upon an angular orientation of the door.

4. An agricultural harvester, comprising:
a threshing and separating system for separating grain from non-grain crop material;
a residue handling system for receiving at least a portion of the non-grain crop material, the residue handling system including a chopper and a windrow arrangement, each having an inlet, and a door which is movable between a closed position which directs the non-grain crop material to the chopper and an open position which directs the non-grain crop material to the windrow arrangement, the residue handling system also including a feed roller positioned adjacent to and between the inlet of the chopper and windrow arrangement, the feed roller being rotatable in a first direction which directs the non-grain crop material to the chopper when the door is in the closed position, and a second direction which directs the non-grain crop material to the windrow arrangement when the door is in the open position, wherein the direction of rotation of the feed roller is dependent upon a position of the door; and
a sensor configured for sensing the position of the door, such that feed roller rotation is controlled based on input from the sensor.

5. The agricultural harvester of claim 4, wherein the sensor is a proximity sensor which is located adjacent to the door when the door is in the closed position.

6. The agricultural harvester of claim 1, wherein the residue handling system further includes a spreader positioned in association with the chopper for spreading non-grain crop material on the field, the spreader being pivotally movable upward and downward, and wherein the windrow arrangement includes a swath board which engages and is movable with the spreader.

7. The agricultural harvester of claim 6, wherein the spreader includes a spread board, and the swath board is movable with the spread board.

8. The agricultural harvester of claim 6, wherein the swath board is movable, dependent on a position of the door.

9. The agricultural harvester of claim 8, wherein the swath board is movable between a raised position when the door is in the closed position, and a lowered position when the door is in the open position.

10. The agricultural harvester of claim 9, wherein the spreader includes a plurality of movable vanes, and the vanes are movable to a position directing non-grain crop material laterally outwards when the door is in the open position.

11. The agricultural harvester of claim 1, wherein the residue handling system includes a swing arm which carries and moves the feed roller between the first position and the second position.

12. An agricultural harvester, comprising:
a threshing and separating system for separating grain from non-grain crop material;
a residue handling system for receiving at least a portion of the non-grain crop material, the residue handling system including a chopper and a windrow arrangement, each having an inlet, and a door which is movable between a closed position which directs the non-grain crop material to the chopper and an open position which directs the non-grain crop material to the windrow arrangement, the residue handling system also including a feed roller positioned adjacent to and between the inlet of the chopper and windrow arrangement, the feed roller being rotatable in a first direction which directs the non-grain crop material to the chopper when the door is in the closed position, and a second direction which directs the non-grain crop material to the windrow arrangement when the door is in the open position; and
an oscillating cleaning system for cleaning grain received from the threshing and separating system, and wherein the residue handling system further includes an infeed pan which is carried by the cleaning system and extends in a rearward direction toward the inlet of the chopper;
wherein the residue handling system includes a second feed roller positioned adjacent to and between the inlet of the chopper and the infeed pan.

13. The agricultural harvester of claim 12, wherein the infeed pan is pivotally attached to the cleaning system and selectively pivotable up and down between a first position directing chaff from the cleaning system toward the inlet of the chopper, and a second position directing chaff toward the ground in front of the chopper.

14. The agricultural harvester of claim 1, wherein the chopper has a rotatable drive element located at one side of the chopper, and the harvester has at least one additional component positioned generally above the drive input, and further including a mechanical drive having an input end positioned forward of the additional component relative to a direction of travel of the harvester, an output end coupled with the drive input of the chopper, and a drive component interconnecting the input end and output end and passing under or over the additional component.

15. The agricultural harvester of claim 14, wherein the drive component includes at least one of a shaft and a belt.

16. The agricultural harvester of claim 15, wherein the drive component includes a pair of belts.

17. The agricultural harvester of claim 14, wherein the mechanical drive is configured for driving the chopper with a plurality of rotational operating speeds.

18. The agricultural harvester of claim 14, wherein the additional component is a fuel tank or a diesel exhaust fluid (DEF) tank.

* * * * *